United States Patent [19]

Matsuno et al.

[11] Patent Number: 5,126,167
[45] Date of Patent: Jun. 30, 1992

[54] PROCESS OF MANUFACTURING A FIBER REINFORCED PLASTIC ARMORED CABLE

[75] Inventors: Shigehiro Matsuno, Gifu; Kenji Kozuka, Ichinomiya; Minoru Naito, Kisogawa; Kazuo Yasuda, Gifu, all of Japan

[73] Assignee: UBE-Nitto Kasei Co., Ltd., Tokyo, Japan

[21] Appl. No.: 714,607

[22] Filed: Jun. 13, 1991

[30] Foreign Application Priority Data

Jun. 13, 1990 [JP] Japan .................. 2-152618
Jun. 14, 1990 [JP] Japan .................. 2-153875

[51] Int. Cl.$^5$ .................. G02B 6/44; B05D 5/06; H02G 15/00; B32B 27/00
[52] U.S. Cl. .................. 427/163; 427/358; 427/385.5; 385/103; 385/104; 385/107; 523/173; 428/394; 428/407
[58] Field of Search ........ 350/96.23, 96.10, 320; 427/163, 355, 358, 385.5, 407.1; 523/173; 428/394, 407; 385/104, 105, 107, 108, 111, 112, 113, 103

[56] References Cited

U.S. PATENT DOCUMENTS

| | | | |
|---|---|---|---|
| 3,946,097 | 3/1976 | Takahashi et al. | 264/90 |
| 4,606,604 | 8/1986 | Soodak | 385/113 |
| 4,671,610 | 6/1987 | Kitayama et al. | 385/107 |
| 4,703,998 | 11/1987 | Uchioke et al. | 350/96.23 |
| 4,725,453 | 2/1988 | Nakasone et al. | 427/163 |
| 4,776,910 | 10/1988 | Taylor et al. | 350/96.23 X |
| 4,781,434 | 11/1988 | Kitagawa et al. | 385/103 X |
| 4,886,562 | 12/1989 | Pinson | 385/107 |
| 4,902,097 | 2/1990 | Worthington et al. | 385/107 |
| 4,929,047 | 5/1990 | Dubots et al. | 350/96.23 |
| 4,944,570 | 7/1990 | Oglesby et al. | 350/96.23 |
| 4,979,795 | 12/1990 | Mascarenhas | 385/107 |
| 4,997,258 | 3/1991 | Oestreich | 350/96.23 |
| 5,013,126 | 5/1991 | Hattori et al. | 350/96.23 |

*Primary Examiner*—Brian Healy
*Attorney, Agent, or Firm*—Wenderoth, Lind & Ponack

[57] ABSTRACT

In the manufacture of a fiber reinforced plastic armored cable, long reinforcing fibers are impregnated with an uncured thermosetting resin and formed into a predetermined shape to obtain a plurality of rod-like members with the thermosetting resin held uncured. Then the uncured rod-like members are passed through a die of a melt extruder, by which the rod-like members are each coated with a thermoplastic resin layer. The coated layers of the rod-like members are immediately cooled to simultaneously form a plurality of fiber reinforced plastic armoring strands with the thermosetting resin held uncured. The armoring strands thus obtained are wound around a cable which is fed while being rotated. The cable having wound thereon the strands is passed through a die portion of a melt extruder, by which the cable is sheathed with a thermoplastic resin layer which is immediately cooled and solidified. The sheathed cable is guided into a curing tank using a liquid as a heating medium to cure the thermosetting resin in the armoring strands. Thereafter, the sheathed cable is wound onto a drum via a rotary take-up device.

9 Claims, 5 Drawing Sheets

PROCESS OF MANUFACTURING A FIBER REINFORCED PLASTIC ARMORED CABLE

BACKGROUND OF THE INVENTION

1. Field of the Invention

The present invention relates to a process of manufacturing a fiber reinforced plastic armored cable for communications or power uses which has a peripheral surface protected and reinforced by fiber reinforced plastic rod-like members or strands.

2. Description of the Prior Art

It is well-known in the art that a cable for communications or power uses is armored with fiber reinforced plastic strands for protecting and reinforcing it. A typical example of such a cable is a large capacity optical fiber cable for communication. The optical fiber cable of this kind has an optical fiber carrying spacer formed of high density polyethylene or similar thermoplastic resin about a tension member and having a plurality of helical grooves cut in its peripheral surface. An optical fiber or tape-like optical fiber core formed by a plurality of optical fibers arranged flat in side-by-side relation is inserted into each helical groove of the spacer and then the spacer thus carrying the optical fibers is coated over the entire area of its peripheral surface with a thermoplastic resin. The optical fiber carrying spacer is disclosed in detail in U.S. Pat. No. 4,781,434. The optical fiber cable thus obtained is usually armored with high-tensile rod-like members so that it is protected from lateral pressure, tensile force and other external forces.

In the case of armoring the optical fiber cable or similar cable, if fiber reinforced plastic strands obtained by curing thermosetting resin impregnated into reinforcing fibers are wound around the cable, there is the possibility of stress cracking in the strands because of high rigidity of the fiber reinforced plastic material. To avoid this problem, there has been proposed an armored cable manufacturing process in which strands of uncured or semi-cured resin are wound around the cable, as set forth in Japanese Patent Publication No. 50364/81.

In the above-mentioned Japanese Publication there is also disclosed an example of such an uncured armoring strand formed by coating an uncured or semi-cured fiber reinforced plastic rod-like member with a protective layer for preventing the adhesion thereto of foreign material.

On the other hand, a composite fiber reinforced plastic strand suitable for use as the above-noted uncured armoring strand is set forth in U.S. Pat. No. 3,946,097 owned by the assignee of this application. The strand is obtained by impregnating reinforcing fibers with an uncured thermosetting resin, coating the resin-impregnated reinforcing fibers with a thermoplastic resin and then solidifying the coated thermoplastic resin while maintaining the internal thermosetting resin uncured.

In the case of employing the above composite fiber reinforced plastic strand for armoring a cable, however, conventional separate steps of producing the uncured strands and armoring the cable therewith impair the storage stability of the uncured thermosetting resin and degrade the physical properties of the composite fiber reinforced plastic strands. This is attributable to an offset or disorder of the arrangement of the reinforcing fibers in the step of winding them on a drum or bobbin.

In Japanese Patent Publication No. 139872/89 filed in the name of the assignee of this application there is disclosed a special thermosetting resin composition of a long pot life for improving the storage stability of the uncured thermosetting resin. However, a fiber reinforced plastic strand formed of the resin of the composition proposed in the above-noted Japanese Publication also suffers lowered strength which is caused by aging of the resin, and its strength after curing may sometimes be inferior to that in the case where a thermosetting resin of a typical composition containing a styrene monomer as a crosslinking component is used and is cured immediately after being impregnated into fibers. Moreover, the problem of offset or disorder of the arrangement of the reinforcing fibers still remains unsolved.

In the fabrication of optical fiber cables, in particular, it is necessary to insert optical fibers into helical grooves of the spacer. This calls for rotating the optical fibers wound on bobbins or the like, or rotating the spacer about its longitudinal axis. In this instance, however, the facility for rotating the bobbins inevitably becomes larger in size with an increase in the length of the cable. In addition, in the case of armoring the thus obtained cable with the fiber reinforced plastic strands, it is necessary to rotate the drum with the strands wound thereon or the cable itself. At any rate, the strands which are long and wound on the drum must be supplied therefrom, and the conventional manufacturing method inevitably necessitates the use of complicated and bulky apparatus.

SUMMARY OF THE INVENTION

It is therefore an object of the present invention to provide a method for the manufacture of a fiber reinforced plastic armored cable which has sufficient strength, obviates the problems of degraded storage stability of uncured resin and an offset or disorder of the arrangement of reinforcing fibers and permits simplification of its manufacturing process.

Another object of the present invention is to provide a fiber reinforced plastic armored cable manufacturing method which permits fabrication of an optical fiber cable with simplified equipment.

To achieve the above objects, the fiber reinforced plastic armored cable manufacturing method of the present invention comprises the steps of: impregnating long reinforcing fibers with an uncured thermosetting resin and forming them into a predetermined shape to obtain a plurality of rod-like members with the thermosetting resin held uncured; passing uncured rod-like members through a die portion of a melt extruder to coat each of them with a thermoplastic resin and immediately cooling such coating to simultaneously form a plurality of fiber reinforced plastic armoring strands with the thermosetting resin held uncured; winding the fiber reinforced plastic armoring strands, at a predetermined helical pitch, around a cable fed while being rotated; passing the cable having wound thereon the fiber reinforced plastic armoring strands through a die portion of a melt extruder to sheath the cable with a thermoplastic resin layer and immediately cooling and solidifying such thermoplastic resin layer; guiding the sheathed cable into a curing tank using a liquid as a heating medium to cure the thermosetting resin in the fiber reinforced plastic armoring strands; and winding the resultant sheathed cable onto a drum via a take-up device.

As the reinforcing fiber for the reinforced plastic armoring strands, it is possible to employ long glass fibers, aromatic polyamide fibers, carbon fibers, or inorganic or organic fibers such as nylon, polyester and Vinylon. As the thermosetting resin, an unsaturated polyester resin, vinyl ester resin or epoxy resin or phenol resin can be used in general.

The thermoplastic resin for coating the uncured strand composed of the reinforcing fiber and the thermosetting resin in combination is not limited to a specific type, as long as it may be formed into a coating by melt extrusion is easy. However, usually it is preferable, from the viewpoints of flexibility, low-temperature resistance, economy, etc., to use polyethylene resins, and polyamide resins are preferable from the viewpoint of flexibility.

The content of the reinforcing fiber in the uncured reinforced plastic armoring strand is generally 50 to 75% by volume, preferably 55 to 70% by volume.

The present invention can be applied to any type of cable, as long as the surfaces thereof are hard enough to be covered with the uncured armoring strands. However, the invention is of particular utility when applied to an optical fiber cable employing a plastic spacer therein.

It is desirable, from the viewpoint of maintaining the physical properties of each armoring strand, that, letting the outside diameter of the composite fiber reinforced plastic strand be represented by 2r and the outside diameter of the centrally-disposed cable by 2R, the helical pitch P for winding the strands around the cable be set to satisfy a formula, $P \geq 8\pi(R+r)$.

The thermoplastic resin for forming the sheath after winding the fiber reinforced plastic strands around the cable may be the same as those mentioned previously for the resin to be used for coating each strand.

The thermosetting resin in each fiber reinforced armoring strand is cured after solidification of the thermoplastic resin for the outermost sheath. In this instance, the thermosetting resin must be cured in a heated curing tank using a liquid as its heating medium, partly because the buoyancy of the liquid can be utilized and partly because heat generated during the curing of the thermosetting resin can effectively absorbed by the liquid. In the case of an optical fiber cable, the curing temperature is in the range of between 80° and 120° C., and when a material of a polyethylene series is used as the thermoplastic resin, the curing temperature may preferably be approximately 100° C. and water is desirable as the medium.

In an embodiment of the present invention, the strands are each coated with waterproof jelly when they are wound around the cable. This is effective in preventing water from entering into the optical fiber cable, for instance.

In a particularly preferred embodiment of the invention, a fibrous water absorbent is packed into air gaps defined between the cable and the fiber reinforced plastic armoring strands and concave portions defined between the strands at the outside thereof. As this fibrous water absorbent, it is possible to employ a continuous fiber having the water absorbing property, a fiber coated all over its surface with a water absorbing material, a fiber impregnated with a waterproof compound and a fiber impregnated with a jelly-like water-proof compound. The amount of fibrous water absorbing material used depends on its water absorbing property, but in general, the air gap packing ratio of the fibrous water absorbent is determined in accordance with the waterproof performance required as the optical fiber cable.

As described above, according to the manufacturing method of the present invention, reinforcing fibers are impregnated with an uncured thermosetting resin, and a predetermined number of fiber reinforced plastic armoring strands each having a coating layer formed around the resin-impregnated reinforcing fiber thereof are continuously produced. At the same time, the strands are wound around a cable and are coated with a thermoplastic resin, followed by curing of the thermosetting resin in the strands in a curing tank employing a liquid as the heating medium. That is, the respective manufacturing steps are continuously carried out. Accordingly, the problems encountered in the past, that is the afore-noted problems such as the impaired storage stability of the uncured thermosetting resin and an offset of the arrangement of the reinforcing fibers, can be avoided.

DESCRIPTION OF THE PREFERRED EMBODIMENTS

Embodiments of the present invention hereinafter will be described in detail.

EXAMPLE 1

An optical fiber cable to be armored was fabricated by such a process as described below.

Figure 2:
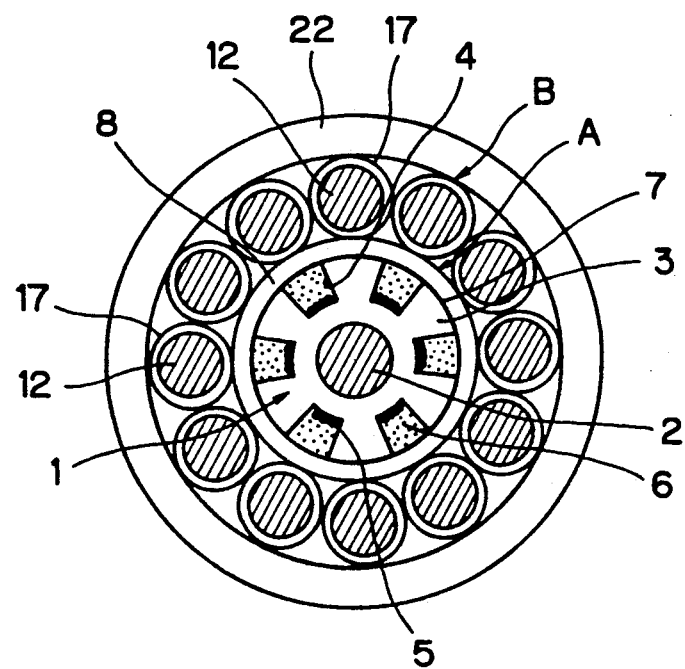
FIG. 2 is a sectional view of an armored cable obtained with the method shown in FIG. 1.

Used as an optical fiber carrying spacer 1 shown in FIG. 2 was a non-metallic spacer, 8.5 mm in outer diameter and having six U-shaped grooves 4 each 2.0 mm deep and 1.5 mm wide (G-K-6-8.5 by Ube-Nitto Kasei Co., Ltd.). The spacer 1 was prepared by coating a FRP (Fiber Reinforced Plastics) rod having a 3.5 mm diameter with low density polyethylene to form a tension member 2 with a 5.8 mm diameter, followed by coating it with a layer 3 of high density polyethylene.

An optical fiber tape-like core element 5, formed by four optical fibers arranged flat in side-by-side relation, was fitted into each groove 4 of the spacer 1 and jelly 6 for waterproofing use was packed into the groove 4. Then, a tape 7, e.g. of polyester fiber, was wound around the spacer 1 and was coated over the entire area of its peripheral surface with a layer 8 of high density polyethylene to form an optical fiber cable A having a 12.5 mm diameter.

Figure 1:
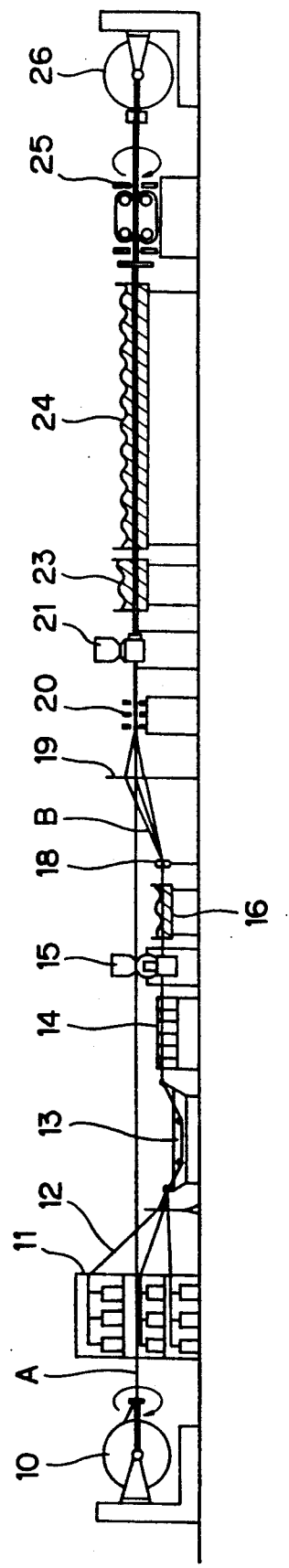
FIG. 1 is a schematic diagram for explaining a fiber reinforced plastic armored cable manufacturing method according to an embodiment of the present invention.

Next, description will be given, with reference to FIG. 1, of a method for armoring the optical fiber cable A with reinforced plastic strands.

The optical fiber cable A wound on a drum 10 was fed therefrom while being rotated about its longitudinal axis, and at the same time uncured reinforced plastic amoring strands B to be twisted around the cable A were produced by the following method.

In this example the armor of the cable A is formed by twelve reinforced plastic strands. For each strand B, a reinforcing fiber 12 was used which was a combination of thirteen pieces of glass fiber roving (RS110 by Nitto Boseki Co., Ltd.) and two pieces of glass yarn (RS28 by the same company) arranged on a creel 11. These pieces of glass fiber roving and glass yarn were bundled together so that the volume percentage of the reinforcing fiber 12 was 60%. Then the reinforcing fiber 12 was fed into a resin bath 13 filled with a mixture of uncured vinyl resin (H-2000 by Mitsui Toatsu Chemicals, Inc.), 0.5 parts of PERKADOX 16 and 3 parts of TRIGONOX 21LS-50 (both Trademarks by Kayuku Akzo Co., Ltd.) as peroxide catalyst for curing, and 0.2 parts of curing agent, by which the reinforcing fiber 12 was impregnated with the resin. The resin-impregnated reinforcing fiber 12 was subjected to stretch forming by a squeeze nozzle 14 to have a 3.5 mm diameter and was then fed into a cross head portion of a melt extruder 15, whereby it was coated over the entire area of its peripheral surface with low density polyethylene (NUCG-0588BK by Nippon Unicar Co., Ltd.) to form an uncured amoring strand with a 4.5 mm diameter. Immediately after this, the uncured amoring strand was led into a cooling tank 16 to cool the polyethylene to form a primary coating 17.

The twelve uncured amoring strands B thus obtained were guided by a guide 18 so that they surrounded the optical fiber cable A which was continuously fabricated and supplied, and then they were coated with waterproofing jelly of a silicon series (DAPHNE by Idemitsu Sekiyu Kagaku Co., Ltd.) in a perforated guide 19, thereafter being guided by a guide 20 around the cable A. In this instance, since the cable A was rotated about its longitudinal axis by the drum 10 and a rotary take-up device 25 and a rotary drum 26 driven in synchronization with the drum 10, the amoring strands B were helically wound around the cable A. Following this, the cable A thus armored with the strands was covered with molten low density polyethylene (NUCG-0588BK by Nippon Unicar Co., Ltd.) which was extruded in a tubular form from an extruder 21, and the cable was immediately introduced into a cooling water tank 23, wherein the molten polyethylene was cooled and solidified to form a sheath 22 with a 25.5 mm outside diameter. The cable was fed into a curing tank 24 filled with hot water of 98° C. wherein it was held for eight minutes to cure the thermosetting resin in the armoring strands B. Thereafter the cable was wound on the rotary drum 26 via the rotary take-up device 25

The helical pitch of the armoring strands B directed around the cable A in this embodiment is 500 mm, which is more than twice as great as $8\pi\{(12.5+4.5)/2\} = 213.6$ mm, calculated according to the afore-mentioned expression $P \geq 8\pi(R+r)$. The 500 mm pitch is within the range in which the reinforced plastic armoring strands B effectively retain their physical properties against the tensile force acting on them, without impairing their strength.

When the helical pitch P is smaller than $8\pi(R+r)$, the strength of the strands would be decreased and the moduli of elasticity of the helical strands would drop to about 80% of that of rectilinear strands. Accordingly, helical pitches smaller than around 213 mm are not desirable in this embodiment.

The tension, which would be applied to the uncured armoring strands B during their twisting around the cable A, was set to 2.3 kg per strand. This value is equal to one-third of a value obtained by multiplying the total denier of the reinforcing fiber 12 by 0.05 g/d.

The reinforced plastic armored cable thus obtained is 25.5 mm in outside diameter and has a cross-sectional configuration as shown in FIG. 2, and its measured physical properties are as follows:

Tensile Test

A lateral tension tester with a maximum of 10-ton load (manufactured by Tokyo Kohki Co., Ltd.) was used. The sheath or coating layer 22 at both end portions of a three meter long sample of the armored cable was peeled off to expose the reinforced plastic strands and both ends of the cable were fixed by epoxy putty to the tester, with a two meter gauge length. The sample was pulled in opposite directions for observing the relationship between the load applied to the cable and its elongation as well as variations in its transmission loss at a 1.3 $\mu$m wavelength.

When the load was below 6000 kg, the transmission loss remained unchanged, and a force which caused a 0.5% elongation of the cable was 2600 kg, nearly equal to a precalculated value.

Compression Test

A compressive force was applied to a 100 mm long portion of the sample at a rate of 1 mm/min, while at the same time the transmission loss was measured at the same wavelength as mentioned above. No variations in the transmission loss were observed until the load increased to 1000 kg.

Bending test

The armored cable was repeatedly wound around mandrels of different diameters to check for resultant variations in transmission loss. No increase in the transmission loss was caused by the mandrels of diameters smaller than 300 mm.

Twist Test

One end portion of the afore-mentioned three meter long sample was twisted with the other end portion exposed to a fixed load of 200 kg, and angles of rotation which caused an increase in transmission loss were measured. No increase in transmission loss was caused until the sample was twisted up to 300 degrees in the same direction as the winding direction of the armoring strands and up to 1080 degrees in the direction opposite thereto.

Flexibility Test

Loads of 2 to 10 kg were applied to the tip of a 30 cm long projecting end of the reinforced plastic armored cable held in the manner of a cantilever, and the amounts of deflection caused by such loads were measured as measures or indications of flexibility of the armored cable. When the load was 10 kg, the amount of deflection was 92 mm. This value indicates sufficient flexibility for a cable having a 25.5 mm diameter.

Low Temperature Test

The armored cable of this example was exposed to low temperatures below $-40°$ C., but cracking or similar defects did not occur in the coating layers or strands themselves.

Further, for checking the effect of reinforcement by the armoring strands according to the present invention, the armored cable of this embodiment and a cable identical in construction therewith except for the omission of the reinforced plastic armoring strands were each compressed 50 mm at a compression rate of 0.5 mm/min, and the load on each cable was measured when the transmission loss at the 1.3 μm wavelength increased. For the unarmored cable the transmission loss began to increase at a 500 kg load, whereas for the armored cable the transmission loss did not increase until the load reached 1100 kg. This indicates that the fiber reinforced plastic armored cable produced by the process of this embodiment also has a sufficient compressive strength.

EXAMPLE 2

A fiber reinforced plastic armored cable was produced which was identical in construction with the cable of Example 1 except that the waterproofing jelly of silicon series used in the above example was replaced with a fibrous water absorbent so as to enhance the waterproof property of the armored cable.

Figure 3:
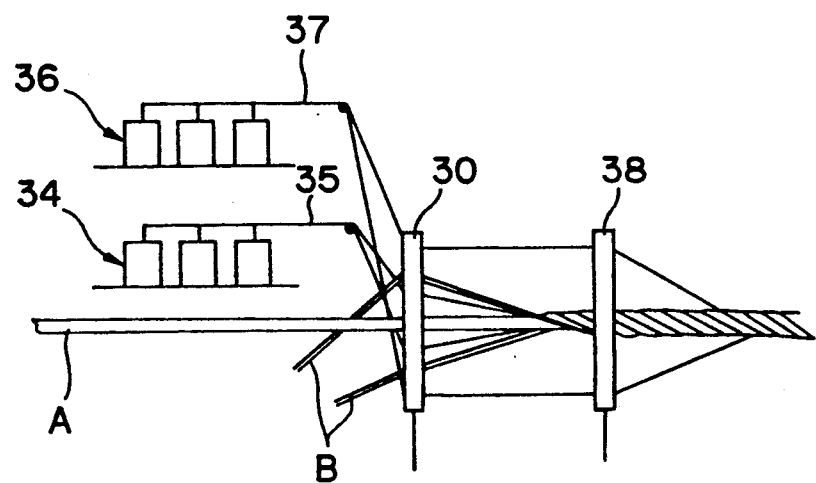
FIG. 3 is a schematic diagram for explaining another embodiment of the present invention.
Figure 4:
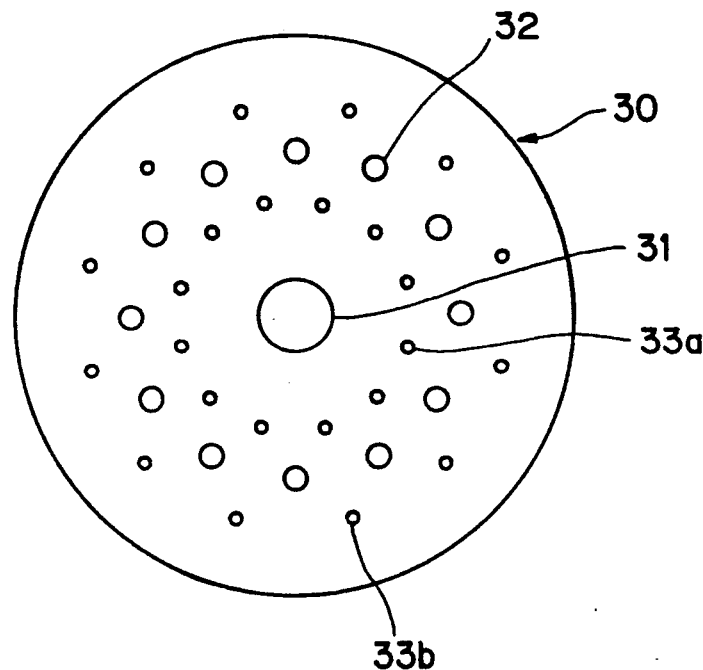
FIG. 4 is a diagram schematically showing a guide for use in the manufacturing method depicted in FIG. 3.
Figure 5:
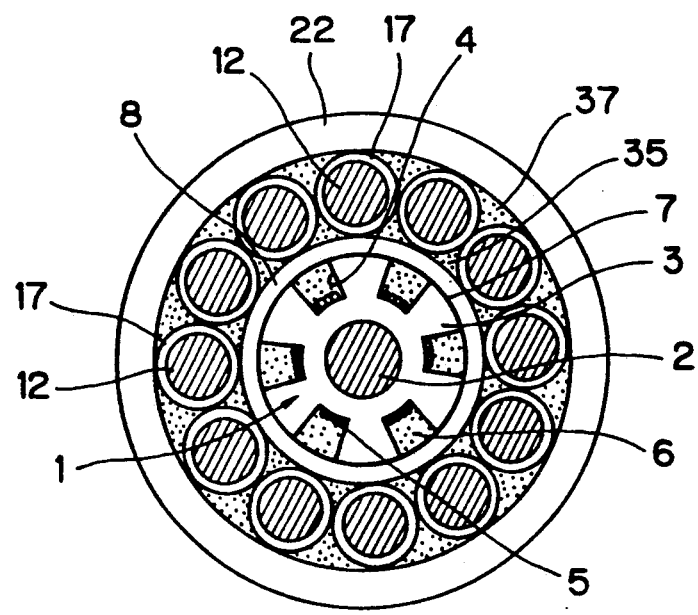
FIG. 5 is a sectional view of an armored cable obtained with the method shown in FIG. 3.

Referring now to FIGS. 3 through 5, differences between Examples 1 and 2 will be described. In this embodiment a guide such as shown in FIG. 4 was employed for winding the twelve uncured armoring strands B around the optical fiber cable A. The guide 30 has a center hole 31 for the passage therethrough of the cable A, twelve equally spaced-apart guide holes 32 for guiding the armoring strands B, twelve inner guide holes 33a disposed between the center hole 31 and the guide holes 32 in the radial direction of the guide 30 and halfway between adjacent guide holes 32 in the circumferential direction of the guide 30, and twelve outer guide holes 33b disposed outside the guide holes 32 and aligned with the inner guide holes 33a in the radial direction of the guide 30. The inner guide holes 33a are arranged so that water absorbing 4.2-denier fibers 35 of a polypropylene series and containing 28.5 wt% of water absorbing resin of sodium polyacrylate, fed from a creel stand 34, and bound into thread-like members of 2600 d/630 f fineness and supplied into air gaps defined between the peripheral surface of the cable A and the armoring strands B adjacent thereto. The outer guide holes 33b are arranged so that they bind water absorbing fibers 37, the same as fibers 35 mentioned above, supplied from a creel stand 36, into thread-like members of 3600 d/870 f fineness and, at the same time, feed them into concave portions defined between the adjoining armoring strands B on the outside thereof, in cooperation with guide holes (not shown) of a guide 38 disposed downstream of the guide 30. The water absorbing fibers 35 and 37 thus fed fill the above-mentioned air gaps and concave portions with a packing ratio of 20% by volume.

The fiber reinforced plastic armored cable of this embodiment has a cross-sectional structure as depicted in FIG. 5. The waterproof property of this cable was measured by the following method. The outermost coating 22 on a substantially central portion of a ten meter long sample was peeled off, after which the sample was placed horizontally on the floor and inserted into a horizontal portion of a T-joint until the central portion of the sample came to lie in the horizontal portion, and then gaps between both ends of the horizontal portion and the cable were sealed. On the other hand, a hose nipple was fixed to an open end portion of a vertical portion of the joint, and a separating funnel filled with distilled water held at the position of a one meter water-head length and the nipple were interconnected by the hose. Then the funnel and the hose were opened and the distance of infiltration of water into the armored cable within a fixed period of time was measured. The distance of infiltration in 24 hours was 180 mm. This means that the armored cable of this embodiment has a sufficient waterproof property.

Incidentally, also when a water absorbing fiber commercially known under the trademark "LANSEL" (by Toyobo Co., Ltd.) was substituted for the above-mentioned water absorbing fiber of polypropylene and used at the same packing ratio as noted above, substantially the same waterproof property could be obtained.

EXAMPLE 3

This embodiment manufactures the armored cable through a continuous process and this method is particularly suitable for use in the case of employing an optical fiber cable.

Figure 6:
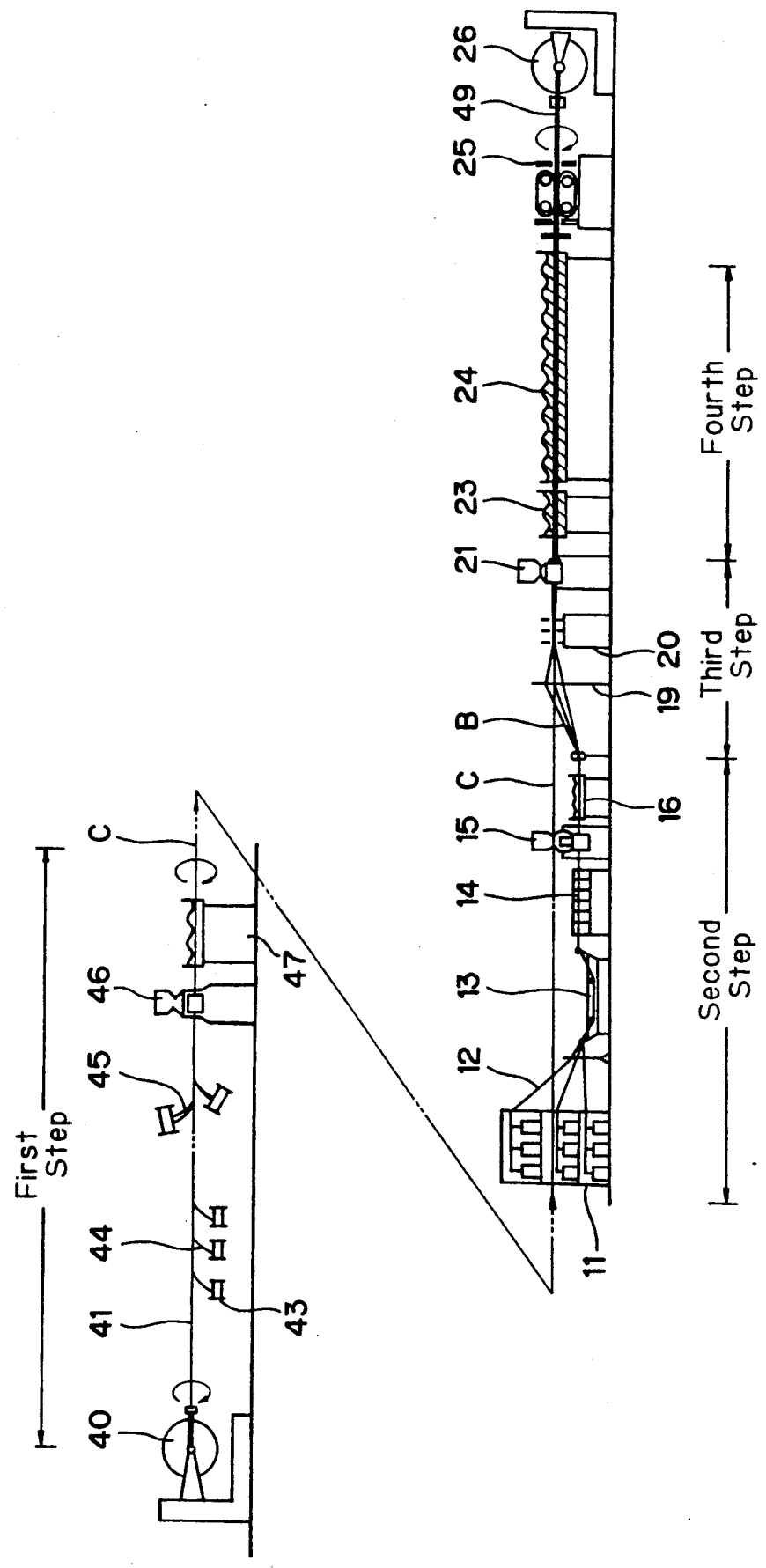
FIG. 6 is a schematic diagram for explaining still another embodiment of the present invention.

The manufacturing method according to this embodiment, shown in FIG. 6, comprises a first step of obtaining an optical fiber cable, a second step of obtaining armoring strands, a third step of twisting the optical fiber cable and the armoring strands together and coating the assembly, and a fourth step of solidifying and curing the coating layer and thermosetting resin. These steps are continuously carried out continuously.

In FIG. 6 reference numeral 40 indicates a spacer supply device which has wound thereon a spacer 41 prepared by a separate process and which rotates the spacer about its longitudinal axis while at the same time letting it out. A description will be given first of the method of making the spacer 41. A tension member 42 (see FIG. 7) to be disposed in the spacer 41 centrally thereof was produced by coating a rod-like member of fiber reinforced thermosetting resin, 3.5 mm in diameter, with low density polyethylene to have an outside diameter of 5.8 mm. The method for the manufacture of the tension member 42 is disclosed in detail in Japanese Patent Publication No. 50591/89 which is a prior application filed in the name of the assignee in this application. Next, molten high density polyethylene was extruded from a rotating die of an extruder onto the outer peripheral surface of the tension member 42, by which the spacer 41 was produced which was 94 mm in diameter and had twelve helical grooves each 1.5 mm wide and deep, with a helical pitch of 500 mm.

In the first manufacturing step the spacer 41 wound on the spacer supply device 40 was let out therefrom, while at the same time eight nylon-sheathed optical fibers 44 wound on small bobbins 43 were paid out therefrom and inserted into eight of the twelve helical grooves of the spacer 41, after which two narrow tapes 45 of polyester fiber were wrapped around the spacer 41 in a manner to cross each other. Then the spacer 41 with the tapes 45 wound thereon was passed through a cross head of a melt extruder 46, by which low density polyethylene (NUCG-0588 by Nippon Unicer Co., Ltd.) was extruded around the spacer 41 to form a sheath 48 so that the overall diameter of the optical fiber cable was 13.5 mm. The sheath 48 was immediately cooled in a cooling tank to obtain an optical fiber cable C.

The second through fourth steps for armoring the optical fiber cable produced as described above are substantially the same as in Example 1, and hence will not be. However, in FIG. 6 the parts corresponding to those in Example 1 are identified by the same reference numerals.

Figure 7:
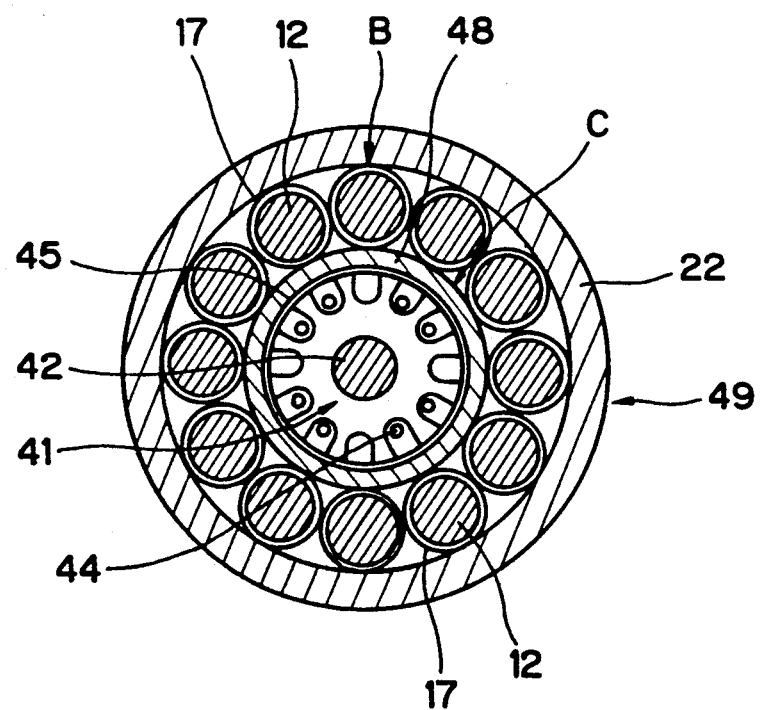
FIG. 7 is a sectional view of an armored cable obtained with the method shown in FIG. 6.

FIG. 7 shows the cross-sectional configuration of fiber reinforced plastic armored optical cable 49 ultimately obtained, and test results revealed that it was satisfactory in tensile strength, twisting strength, compressive strength, bending strength and low temperature characteristics.

It will be apparent that many modifications and variations may be effected without departing from the scope of the novel concepts of the present invention.

What is claimed is:

1. A method for the manufacture of a fiber reinforced plastic armored cable, said method comprising the steps of:
    impregnating elongated reinforcing fibers with an uncured thermosetting resin and forming each of the thus impregnated fibers into a predetermined shape to obtain a plurality of rod-like members with said thermosetting resin held uncured;
    passing said uncured rod-like members through a die portion of a melt extruder to coat said uncured rod-like members with a thermoplastic resin and immediately cooling the resultant coatings to simultaneously form a plurality of fiber reinforced plastic armoring stands with said thermosetting resin held uncured;
    twisting said fiber reinforced plastic armoring strands, at a predetermined helical pitch, around a cable being fed while being rotated;
    passing said cable having twisted therearound said fiber reinforced plastic armoring strands through a die portion of a melt extruder to sheath said cable with a thermoplastic resin layer and immediately cooling and solidifying said thermoplastic resin layer;
    guiding said sheathed cable into a curing tank using a liquid as a heating medium to cure said thermosetting resin in said fiber reinforced plastic armoring strands; and
    winding said sheathed cable onto a drum via a rotary take-up device.

2. The manufacturing method of claim 1, wherein said twisting step includes a step of coating said fiber reinforced plastic armoring strands with waterproofing jelly.

3. The manufacturing method of claim 1, wherein said twisting step includes a step of packing a fibrous water absorbing material into air gaps defined between said cable and said fiber reinforced plastic armoring strands and into concave portions defined between said fiber reinforced plastic strands on the outside thereof.

4. The manufacturing method of claim 1, wherein said cable is an optical fiber cable.

5. The manufacturing method of claim 4, wherein said optical fiber cable is formed by inserting optical fibers into grooves formed on a spacer and then covering said spacer with a sheath.

6. The manufacturing method of claim 5, wherein said optical fiber cable is fed to said fiber reinforced plastic armoring during said strands twisting step immediately after manufacture of said optical fiber cable.

7. A method for the manufacture of a fiber reinforced plastic armored cable, said method comprising continuously carrying out the following steps:
    a) inserting optical fibers into grooves of a spacer and covering said spacer with a sheath, thereby forming an optical fiber cable;
    b) impregnating elongated reinforcing fibers with an uncured thermosetting resin, coating said resin-impregnated reinforcing fibers with a thermoplastic resin while maintaining said thermosetting resin uncured, and solidifying the resultant coatings to simultaneously form a plurality of fiber reinforced plastic armoring strands;
    c) feeding said optical fiber cable while rotating about is longitudinal axis and twisting said fiber reinforced plastic armoring strands around said optical fiber cable at a predetermined helical path;
    d) coating said optical fiber cable having twisted fiber reinforced plastic armoring strands with a thermoplastic resin layer and immediately cooling said thermoplastic resin layer to solidify said layer, thereby forming a sheathed cable;
    e) heating said sheathed cable to cure said uncured thermosetting resin in said fiber reinforced plastic armoring strands; and
    f) winding said sheathed cable onto a drum via a rotary take-up device.

8. The manufacturing method of claim 7, wherein said twisting step includes a step of coating said optical fiber cable and said fiber reinforced plastic armoring strands with waterproofing jelly.

9. The manufacturing method of claim 7, wherein said twisting step includes a step of packing a fibrous water absorbing material into air gaps defined between said optical fiber cable and said fiber reinforced plastic armoring strands and into concave portions defined between said fiber reinforced plastic armoring strands at the outside thereof.

* * * * *